United States Patent [19]

Bianchi et al.

[11] Patent Number: 4,809,424

[45] Date of Patent: * Mar. 7, 1989

[54] TOOL FOR PREPARING COAXIAL CABLE AND FOR POSITIONING AND CONNECTION OF COAXIAL CONNECTOR THEREWITH

[75] Inventors: Edward A. Bianchi, Hummelstown; David H. Gutter, Harrisburg, both of Pa.

[73] Assignee: AMP Incorporated, Harrisburg, Pa.

[ * ] Notice: The portion of the term of this patent subsequent to May 29, 2001 has been disclaimed.

[21] Appl. No.: 376,070

[22] Filed: May 7, 1982

Related U.S. Application Data

[63] Continuation-in-part of Ser. No. 330,626, Dec. 14, 1981, Pat. No. 4,450,621.

[51] Int. Cl.[4] .......... B23B 47/28

[52] U.S. Cl. .......... 29/564.2; 408/103; 408/115 R

[58] Field of Search .......... 29/564.4, 564.2; 408/115 R, 115 B, 72 R, 72 B, 104, 241 G, 103; 269/87.3, 128

[56] References Cited

U.S. PATENT DOCUMENTS

| | | | |
|---|---|---|---|
| 1,583,946 | 5/1926 | Walters | 408/115 |
| 1,977,677 | 10/1934 | Hill | 173/324 |
| 2,166,692 | 7/1939 | Ray | 408/115 |
| 2,380,291 | 7/1945 | Cameron | 408/97 |
| 2,678,574 | 5/1954 | Brinkley | 269/128 |
| 2,753,740 | 7/1956 | Marx | 408/72 |
| 3,252,475 | 5/1966 | Jones | 408/97 |
| 3,486,216 | 12/1969 | Cimolino | 29/427 |
| 3,537,337 | 11/1970 | Best | 269/87.3 |
| 3,625,623 | 12/1971 | Rheinfelder | 408/97 |
| 3,743,433 | 7/1973 | Smith | 408/97 |
| 4,117,749 | 10/1978 | Economu | 81/9.5 R |
| 4,120,554 | 10/1978 | Bianchi et al. | 339/97 R |
| 4,450,621 | 5/1984 | Bianchi | 408/115 R |

*Primary Examiner*—Gil Weidenfeld
*Assistant Examiner*—Daniel W. Howell

[57] ABSTRACT

A tool comprises clamping members spaced from each other on a plate that clampingly engage a coaxial cable. Drill guide members hingedly connected together are latchably secured together onto the plate and they include opposing holes centrally disposed relative to the clamped cable to enable a drill bit to pass therethrough to drill opposed openings through the jacket and shielding and into the dielectric sheathing around the center conductor, whereafter the drill bit and drill guide members are removed. A housing of the coaxial connector containing stationary and movable signal probes is mounted on the plate to position the signal probes relative to the drilled holes whereafter the signal probes are moved into electrical connection with the center conductor and ground conductor members penetrate the jacket and electrically connect with the shielding.

5 Claims, 4 Drawing Sheets

FIG. 2
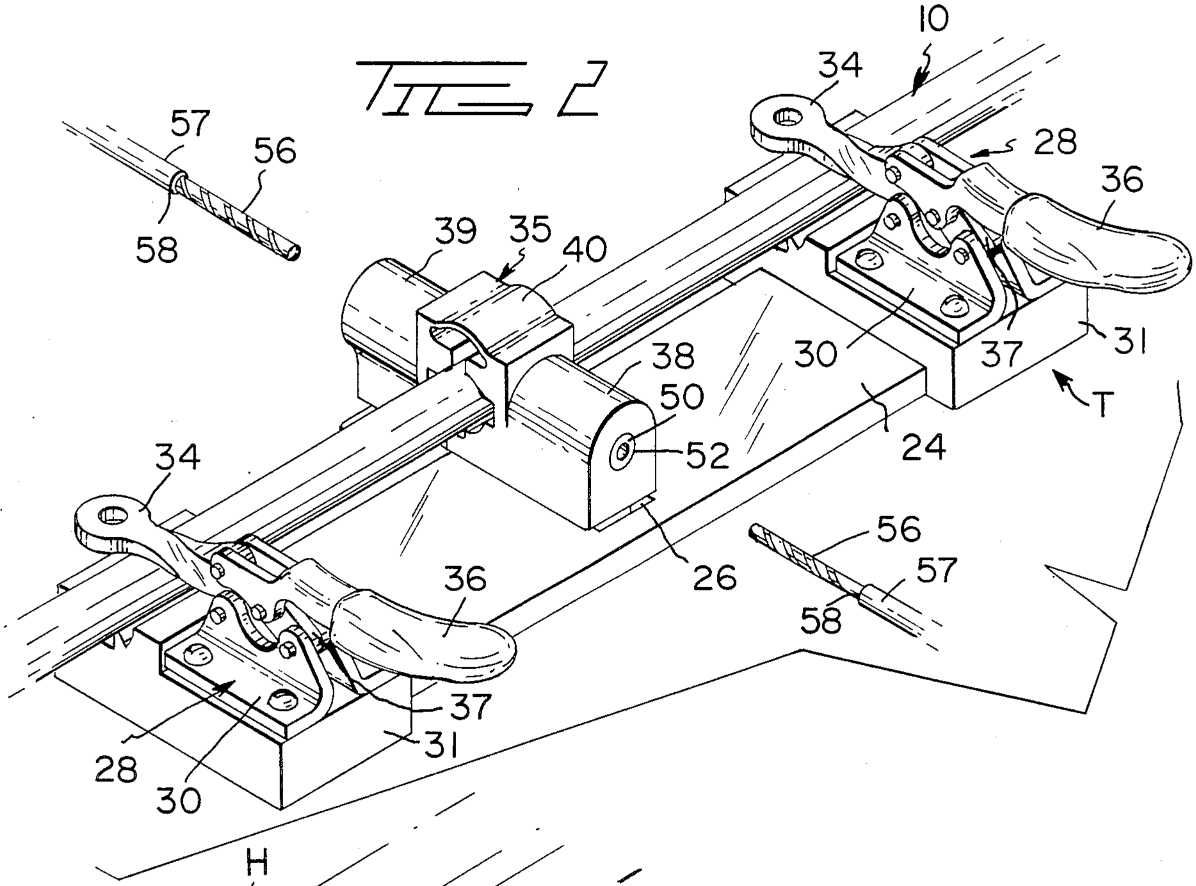
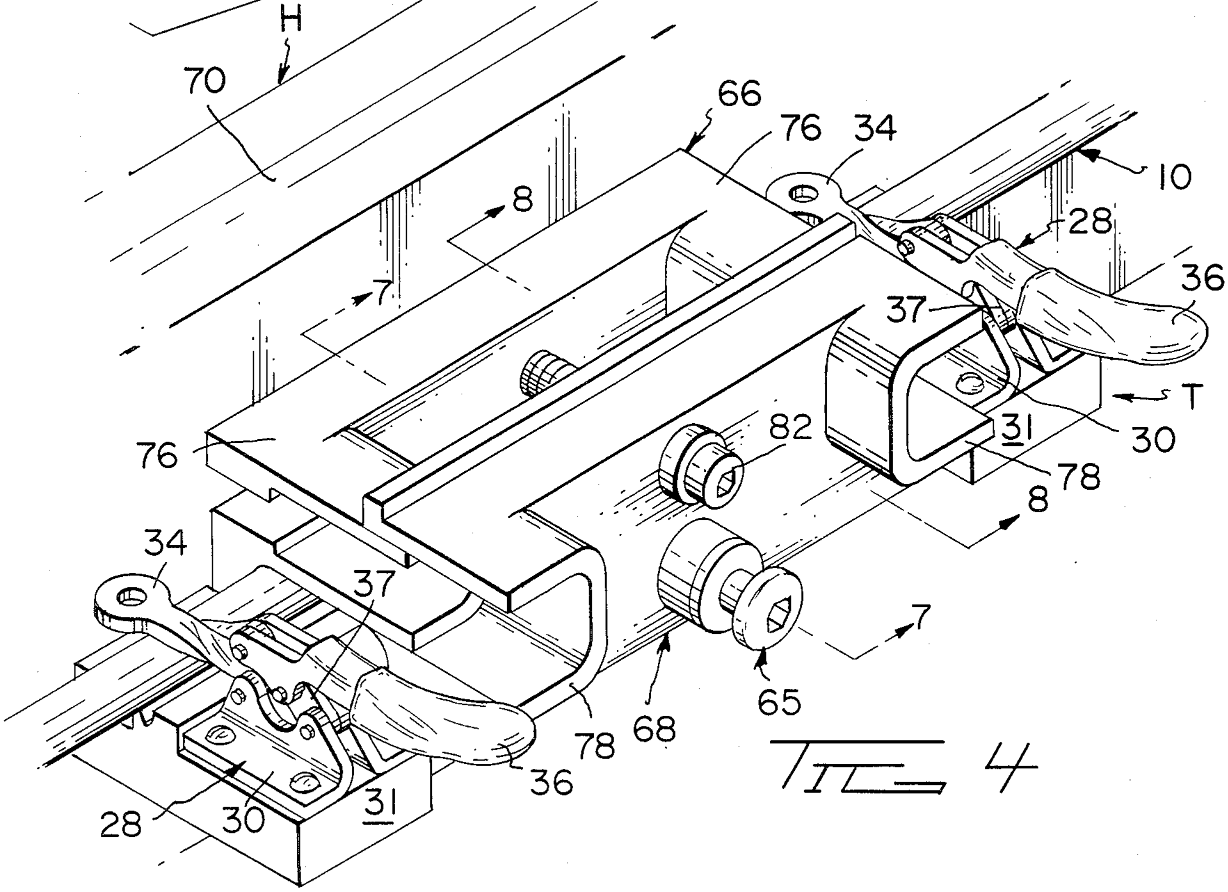
FIG. 4

TOOL FOR PREPARING COAXIAL CABLE AND FOR POSITIONING AND CONNECTION OF COAXIAL CONNECTOR THEREWITH

This application is a continuation in part application of application Ser. No. 330,626, filed Dec. 14, 1981, now U.S. Pat. No. 4,450,621.

FIELD OF THE INVENTION

This invention relates to a tool, and more particularly to a tool for preparing a coaxial cable and for positioning and connection of a coaxial connector therewith.

BACKGROUND OF THE INVENTION

U.S. Pat. No. 4,120,554 and U.S. patent application Ser. Nos. 139,035 and 252,512 filed respectively Apr. 10, 1980 and Apr. 8, 1981 and incorporated entirely as references herein disclose a coaxial connector tap that is electrically connected to the center conductor and outer conductor of a coaxial cable. The center conductor connection is made by opposing signal probes, one of which is movably forced through the protective jacket, outer conductor and dielectric sheath toward the stationary probe until both probes electrically connect the center conductor while being insulated from the outer conductor. This coaxial connector tap has proven to provide effective coaxial tap connections.

the FCC has promulgated specifications for effectively shielding signal conductors and connections therebetween to preclude signal interference and cross talk problems. In this regard, coaxial cables to which the coaxial connector tap of the above patent and patent applications are to be connected include multiple layers of conductive foil and braid. Forcing of the signal probes through the shielding is quite difficult because of the multiple layers of shielding. This places undue forces on the signal probes and subjects them to damage. The probes in penetrating through the shielding carry parts thereof in toward the center conductor which can short the connection. the forces of center conductor connection with the signal probes severely distort the cable and misalignment of the center conductor and the signal probes therewith takes place. These factors cause unacceptable coaxial connections.

U.S. patent application Ser. No. 330,626 filed Dec. 14, 1981, now U.S. Pat. No. 4,450,621, and incorporated entirely by reference herein discloses a tool for preparing the coaxial cable, for positioning a coaxial connector onto the coaxial cable, and for connecting the connector onto the cable. The clamping members and drill blocks of this tool require the use of a tool to clamp the coaxial cable into the clamping members and to secure the drill blocks in position. The present invention overcomes these drawbacks by the use of quick-acting clamping members and drill guide members hingedly connected together and easily mounted in position on the tool plate and removed therefrom without the use of tools.

SUMMARY OF THE INVENTION

According to the present invention, a tool comprises clamping members spaced from each other on a plate that clampingly engage a coaxial cable. Drill guide members hingedly connected together are latchably secured together onto the plate and they include opposing holes centrally disposed relative to the clamped cable to enable a drill to pass therethrough to drill opposed openings through the jacket and shielding and into the dielectric sheathing around the center conductor, whereafter the drill guide members are removed. A housing of the coaxial connector containing stationary and movable signal probes is mounted on the plate to position the signal probes relative to the drilled holes whereafter the signal probes are moved into electrical connection with the center conductor and ground conductor members penetrate the jacket and electrically connect with the shielding.

BRIEF DESCRIPTION of THE DRAWINGS

FIG. 2 is similar to FIG. 1 showing the coaxial cable clamped in the tool and the drill guide members in position on the cable with drill members exploded therefrom.

FIG. 4 is similar to FIG. 3 showing the coaxial connector tap positioned on the tool and coaxial cable prior to being electrically connected thereto.

DETAILED DESCRIPTION OF THE PREFERRED EMBODIMENT

Figure 6:
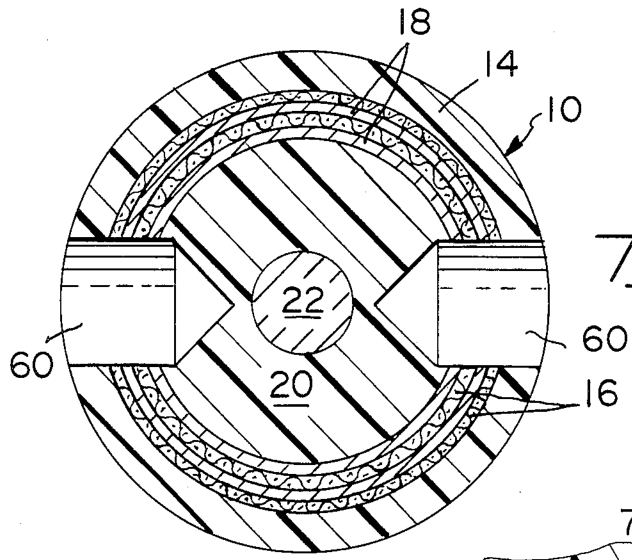
FIG. 6 is a cross-sectional view taken along line 6—6 of FIG. 3 showing the opposed drilled holes in the coaxial cable.

FIGS. 1 through 4 illustrate the various steps for preparing coaxial cable 10 by the use of tool T and electrically connecting coaxial cable tap 12 thereto. As shown in FIG. 6, coaxial cable 10 typically comprises an outer insulating jacket 14, two layers of metal braid 16, two layers of metal foil 18, dielectric sheath 20 and center conductor 22. The reason for the multiple layers of metal braid 16 and metal foil 18 is to provide an outer shielding conductor of a coaxial cable that is acceptable to Federal Communications Commission Standards.

In order to electrically connect coaxial cable tap 12 to coaxial cable 10, tool T is utilized to prepare coaxial cable 10, and it is used for positioning and connection of coaxial cable tap 12 therewith.

As shown in FIGS. 1 through 4, tool T comprises a plate 24 having slot 26 centrally located therein and clamping members 28 secured adjacent the ends thereof. Each of clamping members 28 is a toggle clamp and includes mounting members 30 secured onto block members 31 of plate 24. Block members 31 have recesses 32 therein for receiving coaxial cable 10 therein. A clamping member 34 is pivotally mounted onto mounting members 30 and also to lever 36. A toggle link 37 is pivotally connected between mounting members and lever 36. Movement of levers 36 in a clockwise position causes clamping members 34 to move toward block members 31. Recesses 32 have a sufficient diameter to accommodate a range of sizes of coaxial cable 10.

Figure 1:
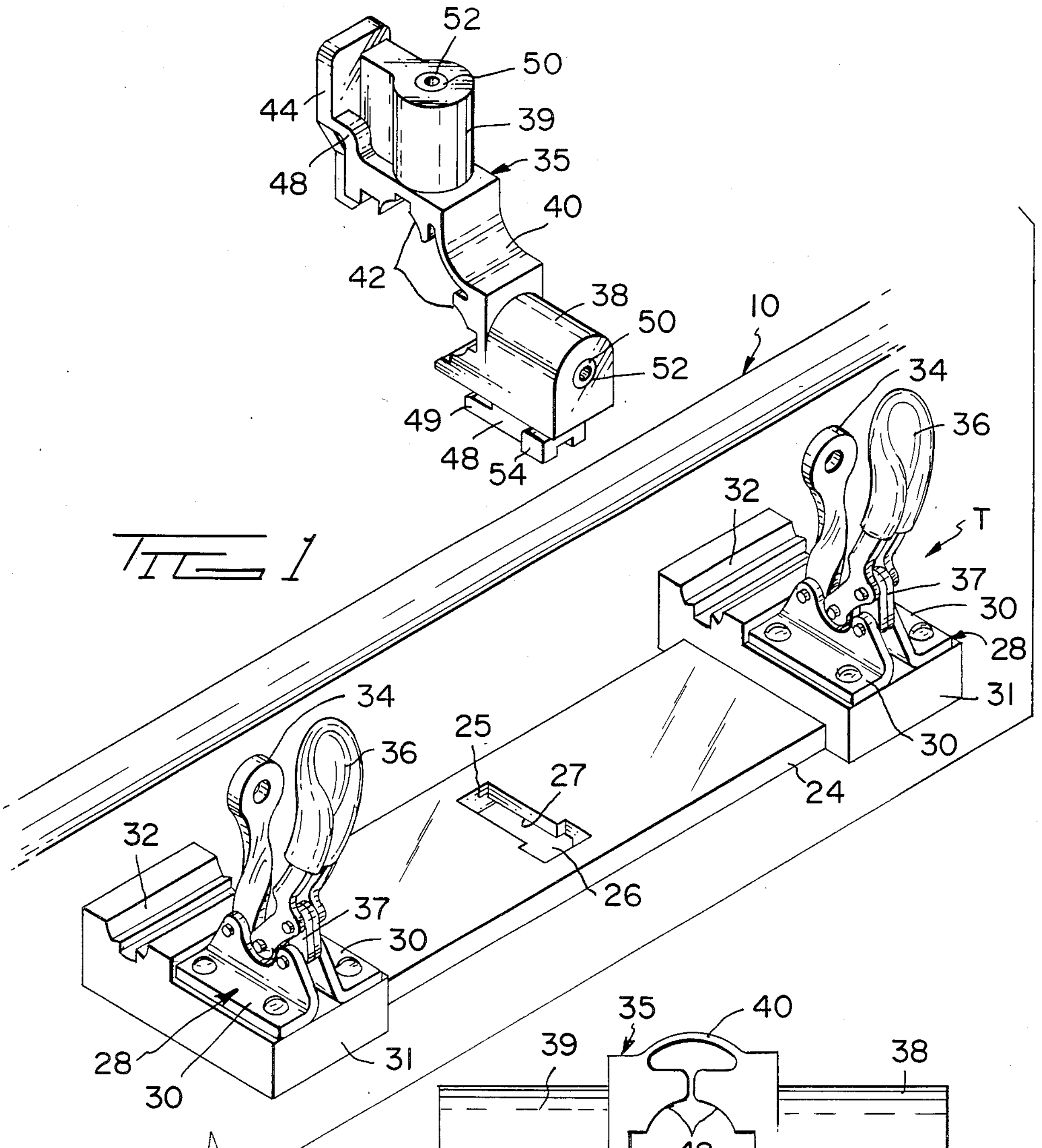
FIG. 1 is a perspective exploded view of a coaxial cable, tool, and drill guide members.
Figure 5:
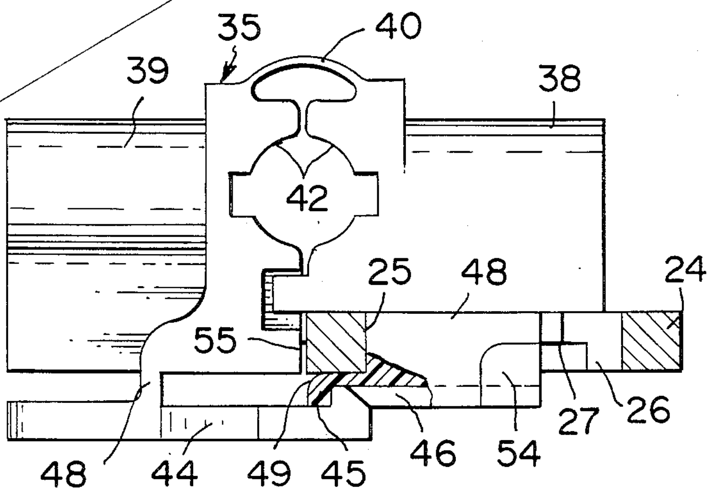
FIG. 5 is a side elevational view partly in section of the drill guide members.
Figure 3:
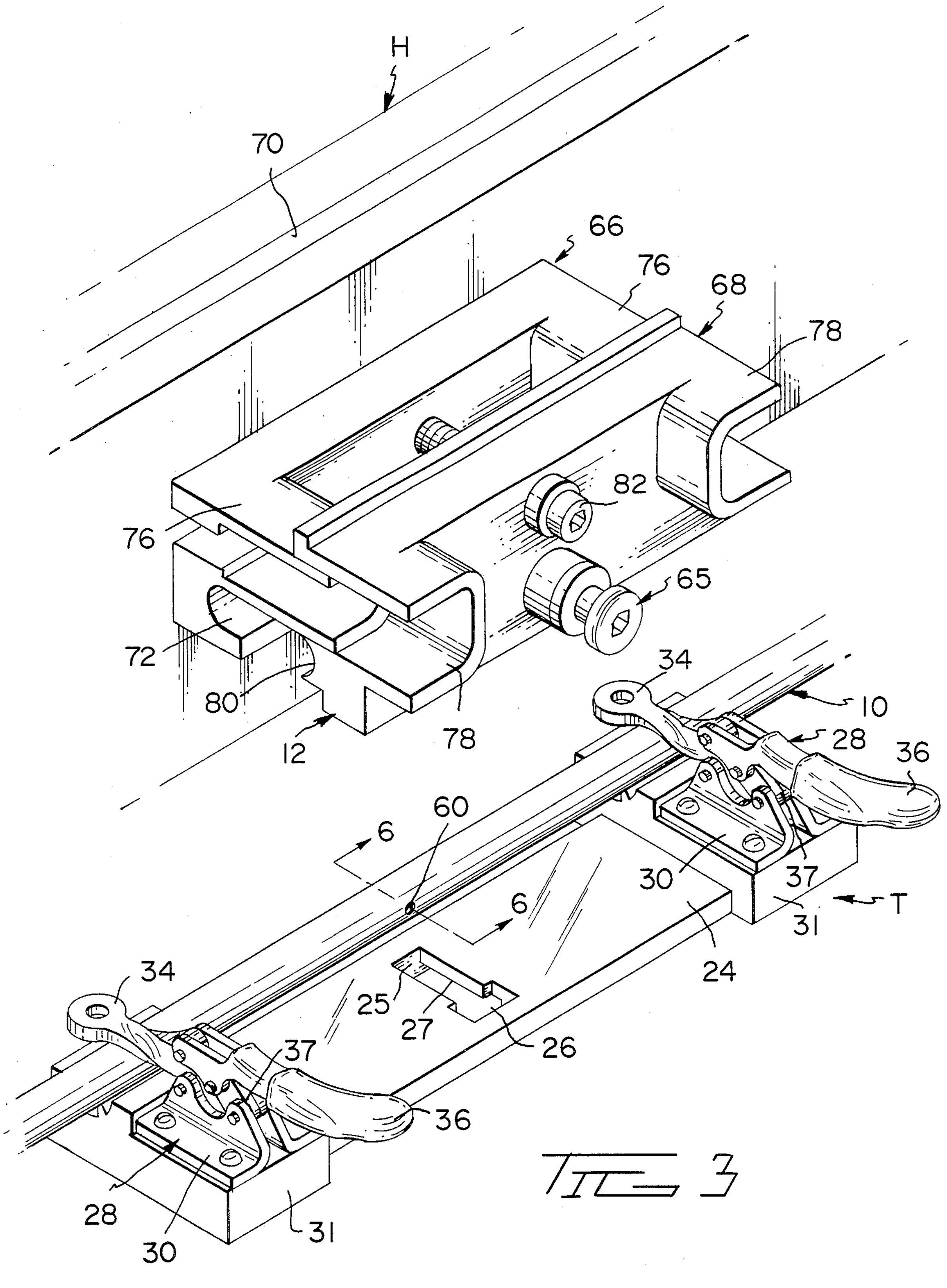
FIG. 3 is similar to FIG. 2 showing the drill guide members removed and a coaxial connector tap exploded therefrom.

With coaxial cable 10 positioned in recesses 32 of block members 31, clamping members 34 are clamped onto cable 10 via levers 36 and maintained in position via toggle links 37 preparatory to drilling opposing holes therein. In this connection, drill guide members 38, 39 are mounting on plate 24 within slot 26 which has a T-shape. Drill guides members 38, 39 of drill guide device 35 are hingedly connected together by integral hinge 40 when they are molded from a suitable plastic material such as acetal resin or the like. Members 38, 39 have recesses 42 in which cable 10 is disposed when members 38, 39 are latchably secured together via latch member 44 latchably engaged onto latching surface 45 within recess 46 in mounting projection 48 of member 38. As shown in FIG. 5, latch member 44 is integrally hinged to member 39 via hinge section 43. Cylindrical inserts 50 are press fitted into bores 52 in members 38, 39. Mounting projection 48 includes lugs 54 which enables projection 48 to fit into T-shaped slot 26 whereafter member 38 is moved along plate 24 until projection 48 engages stop surface 25 and lugs 54 are disposed along undercut surfaces 27 in slot 26 to maintain member 38 in position on plate 24. Protrusion 49 of projection 48 including latch surface 45 extends along the bottom surface of plate 24 adjacent stop surface 25. Bottom section 55 of member 39 is disposed adjacent plate 24 when members 38, 39 are latched together to prevent the drill guide device 35 from moving when in position on plate 24 and cable 10 in recesses 42 as shown in FIGS. 2 and 5. Recesses 42 may accommodate a range of sizes of coaxial cable 10 in the same manner as recesses 32 in clamping members 28.

Figure 7:
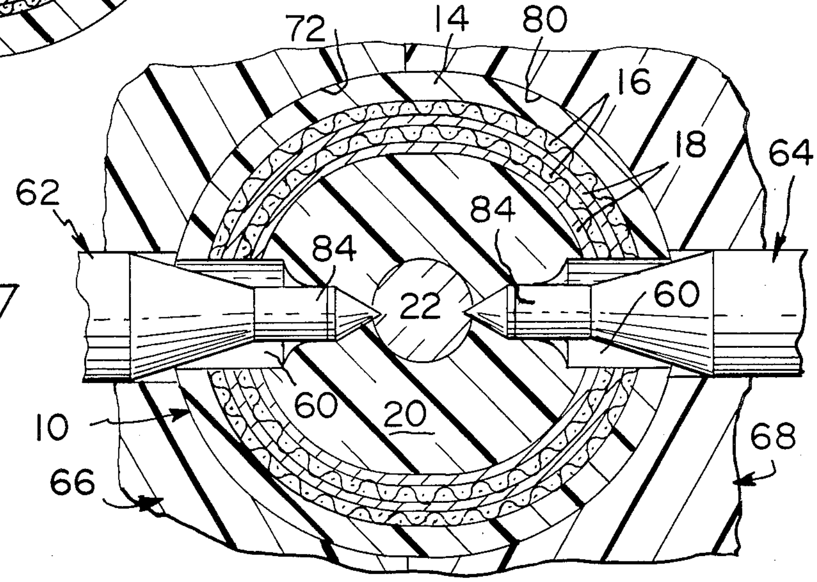
FIG. 7 is a cross-sectional view taken along line 7—7 of FIG. 4 showing the connection of the probes to the center conductor of the coaxial cable when coaxial connector tap has been fully applied.

A drill bit member 56 as shown in FIG. 2 is operated by a conventional drill (not shown) for drilling opposed holes in coaxial cable 10 by insertion of drill bit member 56 within respective inserts 50 which serve as guides for guiding drill bit member 56 relative to coaxial cable 10. Drill member 56 is provided with insulation 57 and a stop 58 to enable drill bit member 56 to be used while coaxial cable 10 is energized and stop 58 prevents drill bit member 56 from drill coaxial cable 10 therebeyond. As shown in FIG. 6, opposed holes 60 are drilled into coaxial cable 10 via drill bit member 56 and, as illustrated, holes 60 extend through jacket 14, layers of metal braid 16, and metal foil 18, and into dielectric sheath 20 stopping short of center conductor 22. In this way, coaxial cable 10 is prepared to receive stationary center conductor probe 62 and movable center conductor probe 64 of coaxial cable tap 12 as illustrated in FIG. 7. The reason that holes 60 are drilled into coaxial cable 10 is because of the difficulty of center conductor probes 62, 64 penetrating through jacket 10 and multiple layers of metal braid 16 and metal foil 18, and the possibility of part of the shielding conductor being dragged along by the signal probes thereby shorting the connection.

Figure 8:
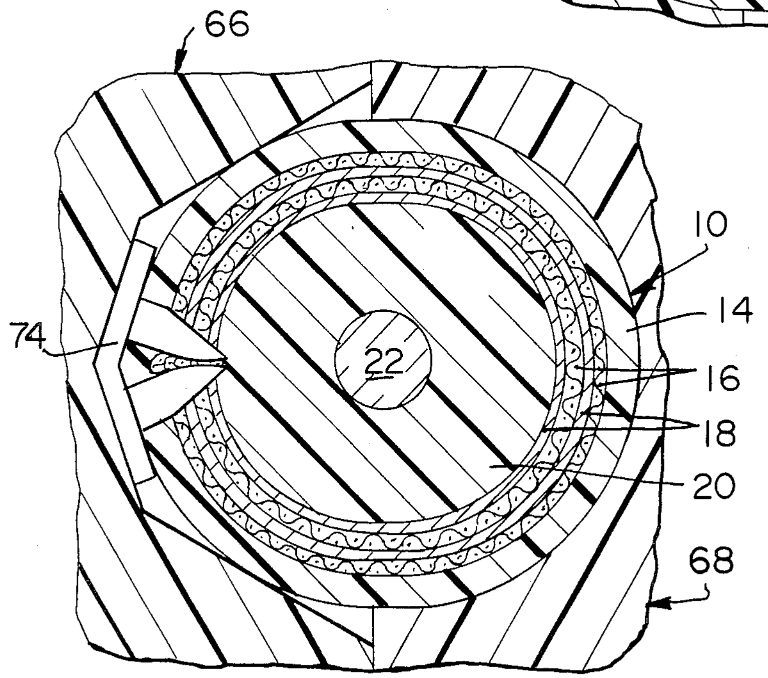
FIG. 8 is a cross-sectional view taken along line 8—8 of FIG. 4 showing the connection of the shield contacts with the outer shielding conductor members of the coaxial cable when coaxial connector tap has been fully applied.

After holes 60 have been drilled in coaxial cable 10, drill guide device 35 is removed from plate 24 and coaxial cable tap 12 is mounted on tool T with housing guide member 66 and movable member 68 movably mounted thereon positioned between block members 31 to position center conductor probes 62, 64 relative to drilled holes 60. Coaxial cable tap 12 is of the general type disclosed in U.S. Pat. No. 4,120,554. Housing guide member 66 is part of housing H which may house a printed circuit board 70 and associated circuitry of coaxial cable tap 12 and in which stationary center conductor probe 62 is located centrally of an arcuate recess 72 in which the coaxial cable 10 is to be disposed. Braid-engaging contacts 74, one being shown in FIG. 8, are disposed on each side of stationary center conductor probe 62 within arcuate recess 72 for penetration through jacket 14 and in electrical engagement with the outer shielding conductor 16 thereunder in accordance with the teaching of the above-mentioned patent and patent applications.

U-shaped guide members 76 of guide member 66 serve as guide members for U-shaped members 78 of movable member 68 which also has an arcuate recess 80 for engagement with coaxial cable 10. The diameter of arcuate recesses 72, 80 is such so as to accommodate a range of sizes of coaxial cable 10. Movable center conductor probe 64 is slideably mounted in movable member 68 and is moved therealong by screw 65 into electrical engagement with center conductor 22 after movable member 68 has been moved into engagement with coaxial cable 10 via screw 82. The action of moving movable member 68 relative to member 66 is performed by screw 82 thereby causing stationary center conductor probe 62 to move into respective hole 60 of coaxial cable 10, penetrate through the remainder of sheath 20 and into electrical engagement with center conductor 22 and braid-engaging contacts 74 to penetrate through jacket 14 into electrical engagement with the outer shielding conductor thereunder thereby securing coaxial cable tap 12 onto coaxial cable 10 whereafter movable center conductor probe 64 is slideably moved along movable member 68 causing center conductor probe 64 to penetrate through the remainder of sheath 20 and into electrical engagement with center conductor 22. Thus, electrical connection with the center conductor and shielding conductor of coaxial cable 10 is now completely effected. Tool T enables coaxial cable tap 12 to be properly located relative to drilled holes 60 to properly align center conductor probes 62, 64 relative thereto prior to electrical termination being made with the shielding and center conductors thereof. In this way, effective termination is made without distortion of the coaxial cable, and no parts of the shielding conductor are carried into the center conductor when probes 62, 64 are electrically connected therewith. Moreover, probes 62, 64 are provided with insulation 84 from the bases of the conical tips out to jacket 14 and therebeyond to prevent any shorting of the termination.

After coaxial cable tap 12 has been terminated to the shielding and center conductors thereof, clamping members 28 are unclamped from the coaxial cable and tool T is removed therefrom.

As pointed out above, cable 10 can be drilled when energized which enables coaxial connector tap 12 to also be electrically connected thereto while energized. Guide member 66 can be provided with a plate through which probe 62 and terminals of contacts 74 extend for electrical connection with appropriate circuitry of a printed circuit board or the like.

The quick-acting clamping members 28 and one-piece drill guide device 35 enable tool T to be effectively used to prepare cable 10 and to position and connect a coaxial connector to cable 10.

We claim:

1. A tool for preparing a coaxial cable and for positioning and connection of a coaxial connector therewith characterized in that:

a plate includes clamping members at spaced positions thereon in which the coaxial cable is clamped and including a slot in said plate disposed between the clamping members;

a drill guide device including drill guide members, one of said drill guide members having a projection mateable with said slot for mounting said drill guide device on said plate, latching members on said drill guide members latchably securing said drill guide members in engagement with the coaxial cable, at least one of said drill guide members having a hole in alignment with a center conductor of the coaxial cable to enable a drill to drill at least one hole through the outer jacket and outer conductor and into the dielectric sheathing of the coaxial cable whereafter the drill guide device is removed from said plate;

said clamping members serving to position the coaxial connector so that a signal probe thereof is in alignment with the drilled hole and is moved into the drilled hole in electrical connection with the center conductor whereafter said tool is unclamped and removed from the coaxial cable.

2. A tool as set forth in claim 1 characterized in that the other of said drill guide members has a hole therein and the holes in the drill guide members are opposed so that opposed holes are drilled into the coaxial cable and along which opposed signal probes extend for electrical connection with the center conductor.

3. A tool as set forth in claim 1 characterized in that said clamping members include block members having recesses therein for receiving the coaxial cable and clamping arms pivotally mounted on said block members for clamping the coaxial cable in said recesses.

4. A tool as set forth in claim 1 characterized in that an integral hinge connects said drill guide members together as a one-piece drill guide device.

5. A tool for preparing a coaxial cable and for positioning and connection of a coaxial connector therewith, comprising:

plate means having clamping means at spaced locations therealong for clampingly securing the coaxial cable therein;

drill guide means including drill guide member means hingedly connected together and having drill guide hole means in at least one of said drill guide member means;

means on one of said drill guide members means for mounting said drill guide means on said plate means between said clamping means;

latching means on said drill guide member means for latchably securing said drill guide member means in engagement with the cable so that drill means can drill a hole in the cable short of the center conductor thereof through said drill guide hole means;

said clamping means serving to position the coaxial connector onto the coaxial cable so that a signal probe connector is in alignment with the drilled hole and can be connected with the center conductor through the drilled hole in the cable.

* * * * *